No. 897,151. PATENTED AUG. 25, 1908.
W. C. & L. T. ROCHELEAU.
PNEUMATIC TIRE.
APPLICATION FILED MAR. 2, 1907.

Witnesses
Geo. A. Bignell
N. C. Healy

Inventors
Walter C. Rocheleau &
Louis T. Rocheleau,
By James Shuhy
Attorney

UNITED STATES PATENT OFFICE.

WALTER C. ROCHELEAU AND LOUIS T. ROCHELEAU, OF WOONSOCKET, RHODE ISLAND.

PNEUMATIC TIRE.

No. 897,151.            Specification of Letters Patent.            Patented Aug. 25, 1908.

Application filed March 2, 1907. Serial No. 360,165.

*To all whom it may concern:*

Be it known that we, WALTER C. ROCHELEAU and LOUIS T. ROCHELEAU, citizens of the United States, residing at Woonsocket, in the county of Providence and State of Rhode Island, have invented new and useful Improvements in Pneumatic Tires, of which the following is a specification.

Our invention pertains to pneumatic tires; and it has for its object to provide an armored pneumatic tire designed more especially for use on the wheels of motor vehicles, and embodying simple and durable means for protecting the inflatable tube of the tire against puncture without robbing the tire as a whole of the requisite resiliency or rendering the tire unduly heavy.

Figure 1:
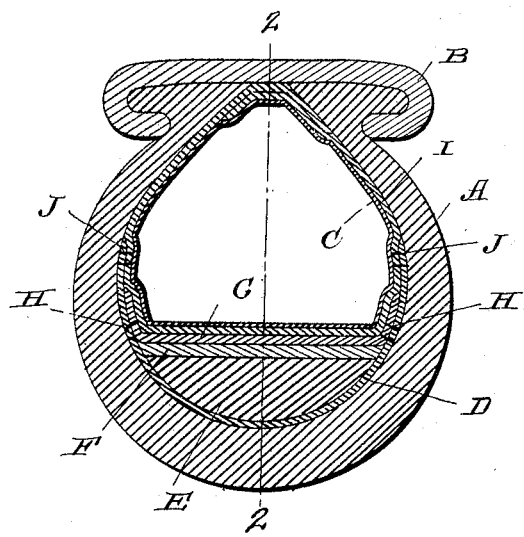
Figure 2:
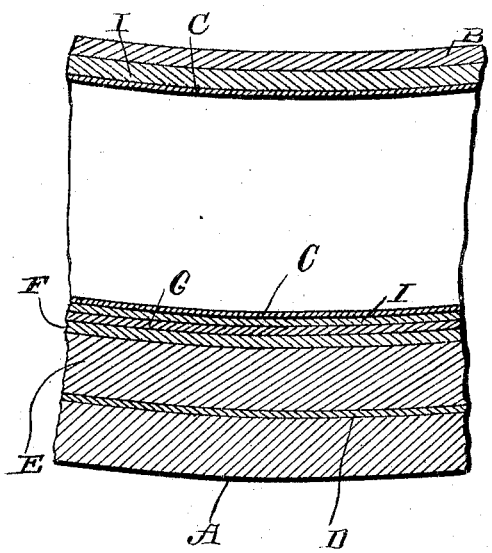

With the foregoing in mind the invention will be fully understood from the following description and claim when the same are read in connection with the accompanying drawings, forming part of this specification, in which:

Figure 1 is a transverse section of an armored pneumatic tire constructed in accordance with our invention. Fig. 2 is a longitudinal, vertical section of a portion of the tire, taken in the plane indicated by the line 2—2 of Fig. 1, looking toward the left.

Similar letters designate corresponding parts in both views of the drawings, referring to which:

A is the outer covering of our novel tire. The said covering A may be made of rubber or any other material compatible with our invention, and may be held on the rim B of a wheel in the manner illustrated or in any other approved manner.

C is the inflatable tube of the tire, which may be of rubber or any other suitable material, and D is a layer of raw hide or other tough material arranged at the inner side of the tread portion of the covering A and extending along the sides of said covering about the proportional distance illustrated.

E is a band arranged at the inner side of the layer D and having for its office to preserve the curved formation of the tread of the tire. The said band E is preferably of rubber, though other materials may be used in the discretion of the manufacturer; and it is of convex-plano form in cross-section and arranged with its flat side inward or remote from the tread portion of the tire.

F is a flat hoop designed to prevent nails, glass and the like from penetrating to and puncturing the inflatable tube C. The said hoop F is preferably of steel because of the strength and springiness of such material, and it is made flat instead of concavo-convex in cross-section in order that it may retain its spring and contribute to the resiliency of the tire as a whole while serving the additional function of protecting the inflatable tube C against puncture. The hoop F is laid directly against the flat side of the band E, and against the inner side of the hoop is arranged a layer G, of raw hide or other tough material, which is riveted, sewed or otherwise strongly connected to the side portions of the layer D at points adjacent to the edges of the hoop F, as indicated by H. From the said points of connection H, the side portions of the layer G are carried inward along the side portions of the layer D, about the proportional distance shown in Fig. 1.

By virtue of the construction described in the foregoing, it will be seen that the band E and the hoop F are snugly incased and held against casual movement by the connected layers D and G, and hence there is no liability of the said band and hoop getting out of their proper positions relative to the other parts of the tire.

Surrounding the inflatable tube C and arranged at the inner sides of the layers G and D and also at the inner side of the covering A is a layer I of raw hide or other material suitable to the purpose. This layer I is riveted, sewed or otherwise strongly connected at the points J J to the portions of the layer D which are extended beyond the layer G for the purpose, and the said layer I is sufficiently wide to entirely incase the inflatable tube C and to have its surplus portions lapped adjacent to the wheel rim B. These lapped portions are not connected together or secured to any other part, but they are simply laid one over the other, and hence it will be apparent that the inflatable tube C may be readily removed when necessity demands. By virtue of the layer I inclosing the inflatable tube C in the manner shown and described, it will be appreciated that the said layer I may be depended on to prevent what is termed a blow-out of the inner or inflatable tube C. Thus when the tire has become weakened from any cause whatever and finally splits open, the layer I will be forced into said split or open portion, closing the same, and thus preventing the inflatable tube which is under pressure from entering said open portion.

It will be gathered from the foregoing that in addition to the ability of our improvements to protect the inflatable tube C against puncture without robbing the tire as a whole of its resiliency, our improvements are advantageous because of the facility with which the parts may be assembled and connected together, and also because of the strength and durability of all of the parts.

The construction herein illustrated and described constitutes the preferred embodiment of our invention, but it is obvious various changes in the form, construction and relative arrangement of the parts may be made in practice without involving departure from the scope of our invention as defined in the appended claim.

Having described our invention, what we claim and desire to secure by Letters-Patent, is:

A pneumatic tire comprising a covering, a layer of tough material arranged against the inner side of the outer portion of the covering, a band of resilient or springy material of convex-plano form in cross-section arranged at the inner side of the said layer, a flat metallic hoop arranged against the inner flat side of the convex-plano band, a layer of tough material arranged at the inner side of the hoop and extending alongside the side portions of the first mentioned layer and connected to said side portions at a point intermediate the edges thereof and the hoop, a layer of tough material having a loop portion arranged against the second mentioned layer and also against the extended side portions of the first mentioned layer and connected to the said extended side portions and also having surplus edge portions lapped one over the other, and an inflatable tube contained in the said layer.

In testimony whereof we have hereunto set our hands in presence of two subscribing witnesses.

WALTER C. ROCHELEAU.
LOUIS T. ROCHELEAU.

Witnesses to signature of Walter C. Rocheleau:
    AUGUSTUS E. INGRAM,
    BAIN L. CAMPBELL.

Witnesses to the signature of Louis T. Rocheleau:
    EDGAR L. SPAULDING,
    ISABELLE SMITH.